(12) United States Patent
Luna et al.

(10) Patent No.: US 7,125,127 B2
(45) Date of Patent: Oct. 24, 2006

(54) OUTSIDE REARVIEW MIRROR FLEXING MECHANISM AND CONTROL METHOD THEREOF

(75) Inventors: Francesc Daura Luna, Barcelona (ES); Oriol Rovira Vera, Barcelona (ES); Llorenc Servera Serapio, Barcelona (ES)

(73) Assignee: Fico Mirrors, S.A.(ES)

( * ) Notice: Subject to any disclaimer, the term of this patent is extended or adjusted under 35 U.S.C. 154(b) by 0 days.

(21) Appl. No.: 10/480,322

(22) PCT Filed: Mar. 15, 2002

(86) PCT No.: PCT/ES02/00129

§ 371 (c)(1), (2), (4) Date: Jun. 25, 2004

(87) PCT Pub. No.: WO02/100684

PCT Pub. Date: Dec. 19, 2002

(65) Prior Publication Data

US 2004/0240023 A1      Dec. 2, 2004

(30) Foreign Application Priority Data

Jun. 11, 2001   (ES)   ................................ 200101338

(51) Int. Cl.
*B60R 1/074*   (2006.01)

(52) U.S. Cl. ...................................... 359/841; 359/877

(58) Field of Classification Search ................ 359/841, 359/872, 877; 248/476
See application file for complete search history.

(56) References Cited

U.S. PATENT DOCUMENTS

| 4,973,146 | A | * | 11/1990 | Nakayama ................... 359/877 |
| 5,008,603 | A | * | 4/1991 | Nakayama et al. ....... 318/568.1 |
| 5,514,940 | A | * | 5/1996 | Okamoto ..................... 318/469 |
| 5,867,328 | A | * | 2/1999 | Stapp et al. ................. 359/841 |

FOREIGN PATENT DOCUMENTS

| JP | 11245725 A | * | 9/1999 |
| JP | 11245726 A | * | 9/1999 |
| WO | WO 200047447 A | * | 8/2000 |
| WO | WO 200110679 A | * | 2/2001 |

* cited by examiner

*Primary Examiner*—Mark A. Robinson
(74) *Attorney, Agent, or Firm*—Black Lowe Graham PLLC

(57) ABSTRACT

An outside rearview mirror flexing mechanism, which is capable of moving the outside rearview mirror between a flexed position and an extended position and vice versa, and which is of the type comprising an electric motor, a mechanical transmission and an electronic control circuit. The flexing mechanism is capable of attaining an activated state by being connected to an electrical power source, and it is capable of being in a locked position and in an unlocked position. The flexing mechanism is provided with a position detector which is capable of detecting the locked position and the unlocked position.

10 Claims, 3 Drawing Sheets

OUTSIDE REARVIEW MIRROR FLEXING MECHANISM AND CONTROL METHOD THEREOF

DESCRIPTION

The invention relates to a flexing mechanism of an outside rearview mirror of an automobile vehicle, capable of moving said outside rearview mirror between a flexed position and an extended position and vice versa, of the type comprising an electric motor, a mechanical transmission and an electronic control circuit, where said flexing mechanism can attain an activated state by being connected to an electrical power source, where said flexing mechanism can be in a locked position and in an unlocked or disengaged position. These flexing mechanisms can be automatic and can be controlled from inside the vehicle.

The invention also relates to a method of controlling said flexing mechanism.

BACKGROUND OF THE INVENTION

The rearview mirror flexing mechanisms of the type indicated above are known. For example, the mechanisms described in document ES-A-2 166 677 or in document EP-A-748719, published on 18. Dec. 1996, hereby incorporated herein by reference, represent clear examples of this type of mechanisms. Rearview mirrors normally adopt two positions relative to the vehicle: an extended position, which is that corresponding to the normal position of use, and a flexed or "parking" position, in which the rearview mirror is flexed, normally through rotation around a substantially vertical axis near to the join between the rearview mirror and the vehicle, so that the rearview mirror protrudes less from the general side surface of the vehicle, and is thus further protected.

In some rearview mirrors, such as those in the invention, the movement of the rearview mirror between the extended position and the retracted position is carried out by an electric motor.

These rearview mirrors usually include a locking mechanism. This locking mechanism allows a locked position to be defined, which is the usual position of use, which is when the mirror is in the extended position, in the flexed position or moving between the two, in normal conditions of use. However, if the mirror receives a blow, or it is abruptly knocked by someone's hand, it comes out of the locked position and adopts an unlocked position fulfilling the function of a "mechanical fuse". In this way, it is possible to prevent the mechanism from breaking if it is knocked and/or the possibility of moving the mirror manually if so desired under certain circumstances. Usually, this locking mechanism has indents and protrusions distributed between the fixed and movable part of the rearview mirror which mesh together but can disengage in the presence of a strong force, greater than that produced by the electric motor.

Logically, when the flexing mechanism is in the unlocked position (it is not really an actual position but rather the whole unlocked area extending between two locked positions), the extended and flexed positions no longer correspond to what they should be, whereby the flexing mechanism has to be reset in the locked position so that the rearview mirror can be used correctly.

There are flexing mechanisms which are capable of moving a rearview mirror between a flexed position and an extended position and vice versa. However, these devices are not capable of detecting whether the flexing mechanism is in the locked or unlocked or disengaged position, and therefore it is necessary that the user revises the system manually.

JP-A-11 245 725 and JP-A-11 245 726 disclose a flexing mechanism of the kind disclosed with an electronic control circuit provided with a position detector that is capable of detecting said locked position and said disengaged position of said flexing mechanism. DE-A-199 06 150 and U.S. Pat. No. 5,514,940 also disclose such a mechanism.

However none of the cited prior art includes the features proposed by the present invention.

SUMMARY OF THE INVENTION

The aim of the invention is to overcome these drawbacks. This aim is achieved by means of a flexing mechanism of the type indicated at the beginning characterised in that it is provided with a position detector capable of detecting the locked position and the unlocked or disengaged position of the flexing mechanism. Effectively, in this way, the position detector can emit a signal informing on the position of the flexing mechanism.

This signal can be one of various types and can contain information that is detailed or not. Preferably the signal merely indicates two possible states: locked-unlocked, since in the majority of cases this is sufficient information.

Preferably, the position detector comprises a Hall effect sensor and at least one magnet. Therefore, if for example the sensor is placed on one of the meshing points on the fixed or movable part, and the magnet is placed on the corresponding meshing point on the other part (movable or fixed respectively) and in the proximity of the Hall effect sensor when the mechanism is locked, upon moving the flexing mechanism to an unlocked position, the two meshing points are forced to disengage and separate. This will modify the output signal from the Hall effect sensor, which will allow the unlocked position to be detected.

It is possible to provide the position detector with a plurality of Hall effect sensors and a plurality of magnets, however, it may be sufficient and logically advantageous, to provide one Hall effect sensor and one magnet on each of the meshing points where the meshing point carrying the Hall effect sensor can mesh. Furthermore, the magnet may be any type, such as for example an electromagnet. However, it is particularly advantageous to use a permanent magnet, which simplifies the construction of the ensemble.

Another additional advantage can be achieved by causing the Hall effect sensor-to be supplied by the two electrical conduits supplying the electric motor. In this way, the amount of additional electrical conduits is reduced to a minimum, with the subsequent savings in costs and space. A preferred embodiment in this sense consists in supplying the sensor on the basis of electrical impulses having a duration short enough to prevent them from moving the corresponding electric motor but long enough to obtain a reading of the sensor output signal. In this way, the sensor is activated only during a brief period of time, during which the sensor output signal is read, and it remains inactivated until a new sensor reading is required. For example, a mechanism in which the reading of the sensor output signal is taken every 0.5–3 s (preferably every 1.3 s), and where the electrical impulse lasts approximately 1–1.5 ms (preferably 1.2 ms).

A particularly interesting embodiment of the invention is obtained when availing of the position detector signal so that the flexing mechanism is capable, on its own, of moving to the locked position. In this way, if when driving (or at any other time) the flexing mechanism has moved to an unlocked position, the mechanism itself corrects this position, automatically adopting a locked position again.

Flexing mechanisms usually include elements that require electrical power (electric motor, electronic control circuit, position detector, etc.). The source of electrical power is preferably the vehicle battery. Advantageously, the flexing mechanism is capable of attaining an activated state directly with the vehicle ignition key, so that when turning said key in the ignition direction corresponding to said engine, which in general usually includes a contact step with the battery and, subsequently, a start-up motor activation step, said outside rearview mirror is moved from said flexed position to said extended position and upon turning said key in the direction for switching off said motor said outside rearview mirror is moved from said extended position to said flexed position. In this way, the rearview mirror is positioned (between the flexed and extended positions) automatically, without the need for any particular action to be taken by the driver.

In order to prevent the electric motor from trying to move the rearview mirror or the flexing mechanism to an inaccessible position, in the sense that there is some physical obstacle preventing the desired position from being reached, it is convenient that the electronic control circuit in the flexing mechanism detects the electric current ramp circulating through the electric motor when it tries to move the rearview mirror but is unable to do so, either because the rearview mirror has reached one of said flexed or extended positions or because there is an obstacle in its path blocking its movement. In this way, the flexed and extended positions of the rearview mirror can be defined by simple mechanical stops and, at the same time, it is possible to prevent any external obstacle from jeopardising the integrity of the motor. Moreover, if the external obstacle is, for example, the driver's finger, or someone else's, they are protected from injuring themselves. Advantageously in these cases, the electronic control circuit interrupts the electric current supply to the motor according to the values of said current intensity ramp and some threshold values that are a function of the room temperature and the battery voltage. In this way, the current intensity fluctuations that must be considered as the result of the variation in room temperature are taken into account and, as well as therefore the variation in the temperature of the flexing mechanism components.

Nowadays, the large majority of vehicles are provided with two outside rearview mirrors. Preferably, the flexing mechanism comprises one single electronic circuit capable of controlling both outside rearview mirrors. Advantageously this electronic control circuit is housed in one of the outside rearview mirrors and is connected to other outside rearview mirror by only three electric wires.

Preferably another embodiment of the invention is obtained when the electronic control circuit measures the time taken to perform a movement and compares it with a minimum target time in order to assess whether said movement has made it possible to reach said target position. In this way, the electronic control circuit can determine whether the position reached is the correct one or not.

An additional improvement consists in the electronic control circuit taking into account the time taken to complete the previous movement before beginning a new movement so as to determine the target position. Therefore, for example, if a first movement is made which, owing to an external obstacle, does not reach the target position but remains halfway and, therefore takes half the envisaged time, and then a second attempt is made to reach the target position and reaches it satisfactorily, but again in half the envisaged time, since half the trajectory had already been covered in the previous movement, the electronic control circuit will recognise this circumstance, since it will take into account the time of the previous movement in its assessment.

Once again it is advantageous that the electronic control circuit takes external factors into account, in this case those that may affect the minimum target time, such as the room temperature and supply voltage.

As already mentioned, it is convenient that the flexing mechanism extends the rearview mirror when it is activated and flexes the rearview mirror when it is deactivated. This is carried out preferably oh the basis that when activated said mechanism sets the extended position as the target position and on the basis that it sets the flexed position as the target position before attaining the deactivated state. For this reason, for example, the electronic control circuit can be provided with two supplies from the battery: one direct and the other controlled by the ignition key. Upon detecting the interruption of the current by means of the ignition key, the electronic control circuit sets the flexed position as the target position and the electric motor carries out the corresponding movement, being supplied by the direct supply from the battery.

As an alternative to the Hall effect sensor a microswitch (or microswitches) can be used. In any event, it must be understood that the invention can operate with any position detector that can detect the locked and the unlocked positions or, in other words, that is capable of distinguishing between both positions.

Under certain circumstances it is of interest that the flexing mechanism does not operate normally, and that instead the flexing mechanism is urged to set certain target positions. For example, if it is desired to park in a very narrow space which requires flexing the rearview mirror, although the vehicle motor is running (and, therefore, the battery is connected), it is advisable, for example, to have a manually operated button to flex the rearview mirror as desired. Moreover, for example in the previous case, it is of interest that the rearview mirror does not extend when the battery is connected by means of the ignition key, but rather that it only extends when the express order is given by the driver, for example, by means of a button, which can be the same as that above. Therefore, advantageously the flexing mechanism is provided with a button that enables the flexed position to be defined as the target position and, if said target position has been defined by this button, the target position can be modified only by the button.

Preferably the flexing mechanism comprises a microcontroller, since in this way the various functions can be carried out more efficiently.

Other advantages and features of the invention can be appreciated from the following non-limiting description of a preferred embodiment of the invention, with reference to the accompanying drawings, in which:

DESCRIPTION OF THE PREFERRED EMBODIMENTS

Figure 1:
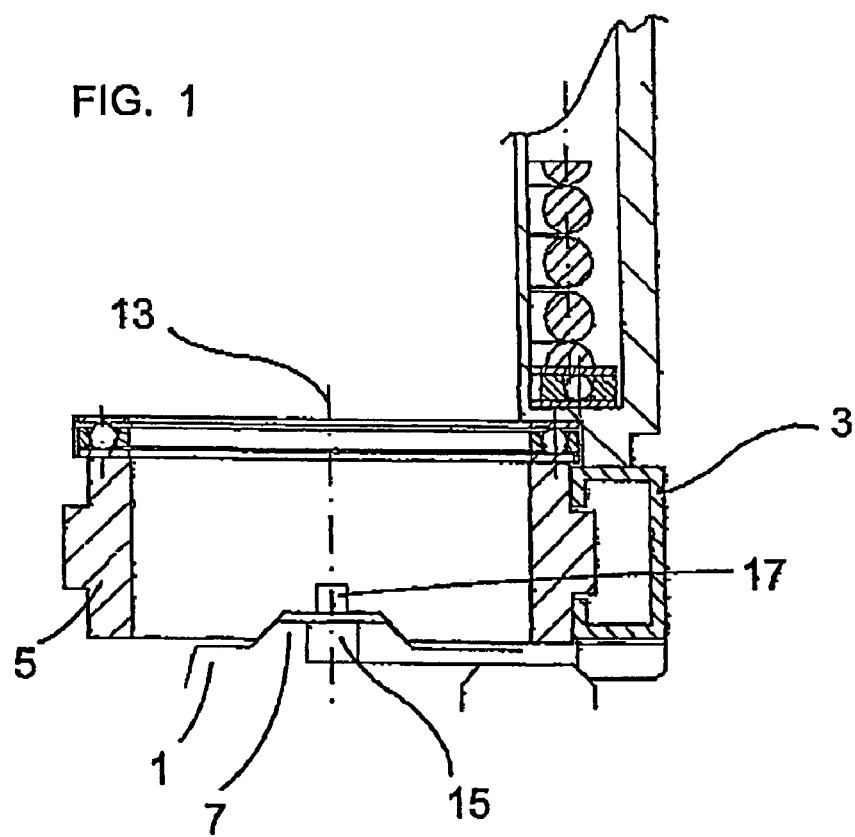
FIG. 1 is a side cross sectional view of a flexing mechanism according to the invention.
Figure 2:
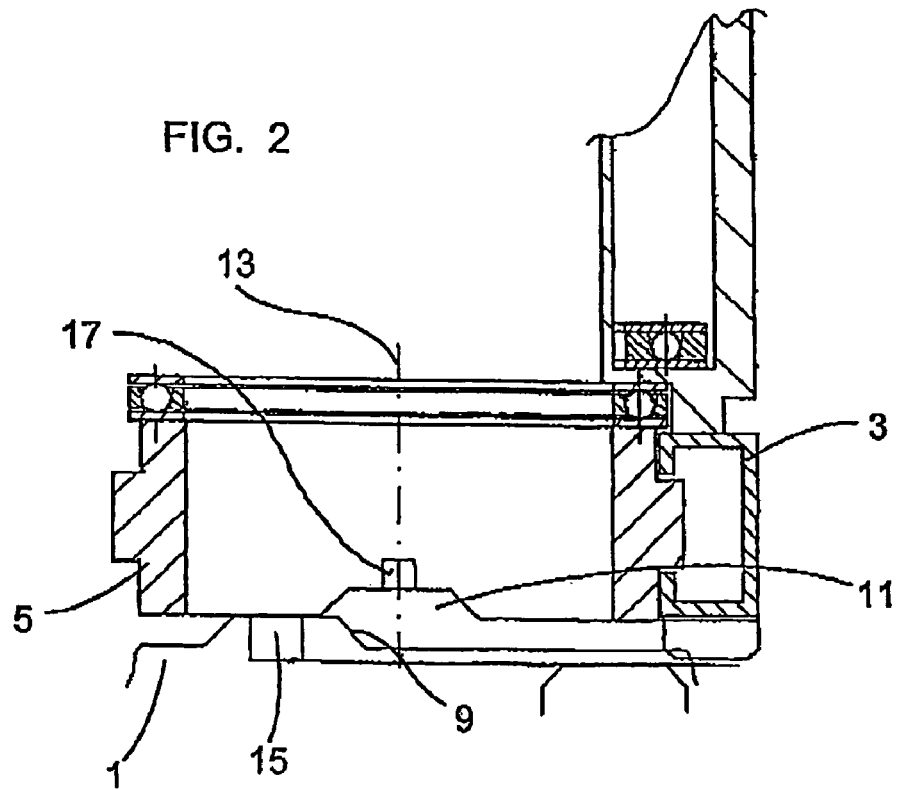
FIG. 2, the view in FIG. 1, but in an unlocked position.

The flexing mechanism disclosed is very similar, in mechanical terms, to those described in document ES P9902630 or in document EP 748.719 A2, published on 18. Dec. 1996, hereby incorporated herein by reference, and which form part of the state of the art known to a person skilled in the art. Therefore the common mechanical contents with mechanisms described in said documents shall not be explained.

With respect to this invention, it is simply to be remembered that the flexing mechanism has a support chassis 1, integral with the vehicle, a housing chassis 3, which is integral with the rearview mirror, and a crown gear 5, forming the union between support chassis 1 and housing chassis 3.

Support chassis 1 has gear teeth 7, with inclined side walls 9 that are capable of meshing in recesses 11 on crown gear 5. Housing chassis 3 is joined to crown gear 5 so that it can rotate around a rotation axis 13. To this end it is provided with an electric motor that acts upon a worm gear meshing onto a wheel gear fixed to crown gear 5.

Usually, support chassis 1 has a plurality of teeth 7 arranged in a uniform manner at an angle around rotation axis 13, and crown gear 5 is provided with a plurality of recesses 11, so that all mesh simultaneously.

The flexing mechanism in accordance with the invention is provided with a Hall effect sensor 15 arranged on the upper end of some of teeth 7, and a magnet 17 on the upper end of each recess 11. In this way, sensor 15 detects magnet 17.

In order to flex and extend the rearview mirror, housing chassis 3 rotates around crown gear 5, in a manner known to a person skilled in the art. Under these conditions, the flexing mechanism is in the locked position, since support chassis 1 and crown gear 5 remain immobile with respect to each other.

In the event of a knock, or a sudden hand movement, crown gear 5 is urged to move integrally with housing chassis 3 (the electric motor is switched off) whereby crown gear 5 disengages and remains in an unlocked position, whereby the rearview mirror rotates around rotation axis 13. At this point sensor 15 ceases to detect magnet 17.

A spring continually applies a force that tends to press crown gear 5 against support chassis 1.

In order to mesh crown gear 5 in support chassis 1 again the electric motor takes housing chassis 3 to the flexing position, in which there is provided a stop for housing chassis 3. The electric motor then moves crown gear 5 until it meshes again, at which point sensor 15 detects magnet 17 again (either the same one or one in another recess). From this point the electric motor can now move the rearview mirror to the extended position, if desired.

Figure 3:
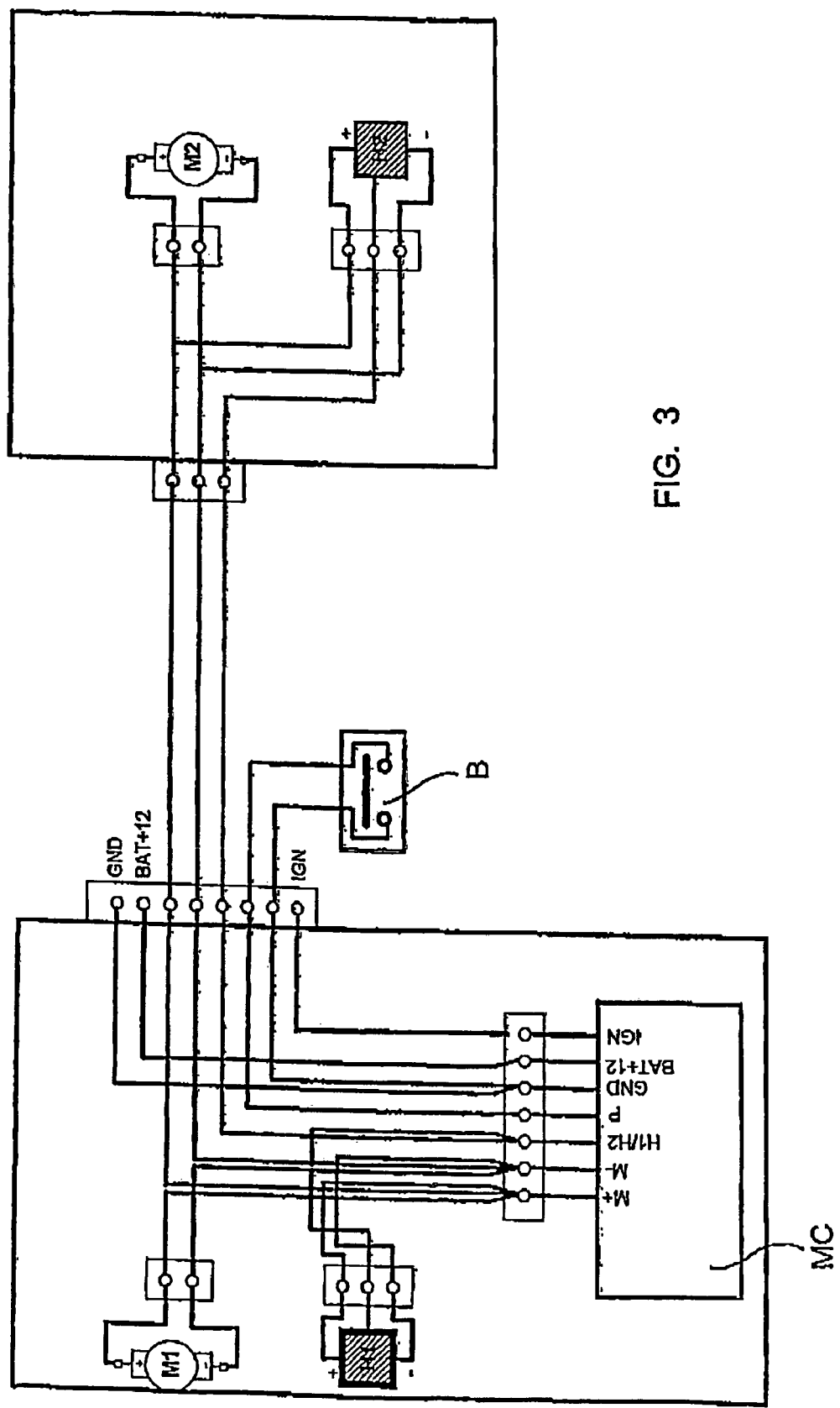
FIG. 3, an electrical circuit diagram of a flexing mechanism according to the invention.

FIG. 3 is an example of a possible electrical circuit diagram of a flexing mechanism according to the invention. The left hand side of the diagram shows the elements physically housed in the rearview mirror on the driver side and the right hand side shows the elements physically housed in the rearview mirror on the passenger side. Each rearview mirror is provided with an electric motor, M1 and M2, and a position detector which, particularly in this example is a Hall effect sensor, H1 and H2. In the rearview mirror on the driver side, the electronic control circuit is also housed, in the form of a microcontroller MC.

The ensemble is connected directly to the battery, BAT +12V, and through the vehicle ignition key IGN., and it is connected to ground GND. The microcontroller is provided with connections M+ and M− for supplying electric motors M1 and M2 and sensors H1 and H2. In addition, there is a third electrical connection between the microcontroller and sensors H1 and H2. On the driver side, a button B is provided for manually forcing the flexed and extended positions of the rearview mirror. Button B is connected to the battery by means of GND and to connection P of the microcontroller. In this way, the microcontroller knows at all times if this button has been activated and, therefore, if its command should be prioritised over the conventional flexing and extension commands. As it can be seen, only three electrical conduits are necessary to govern the flexing mechanism on the passenger side.

Figure 4:
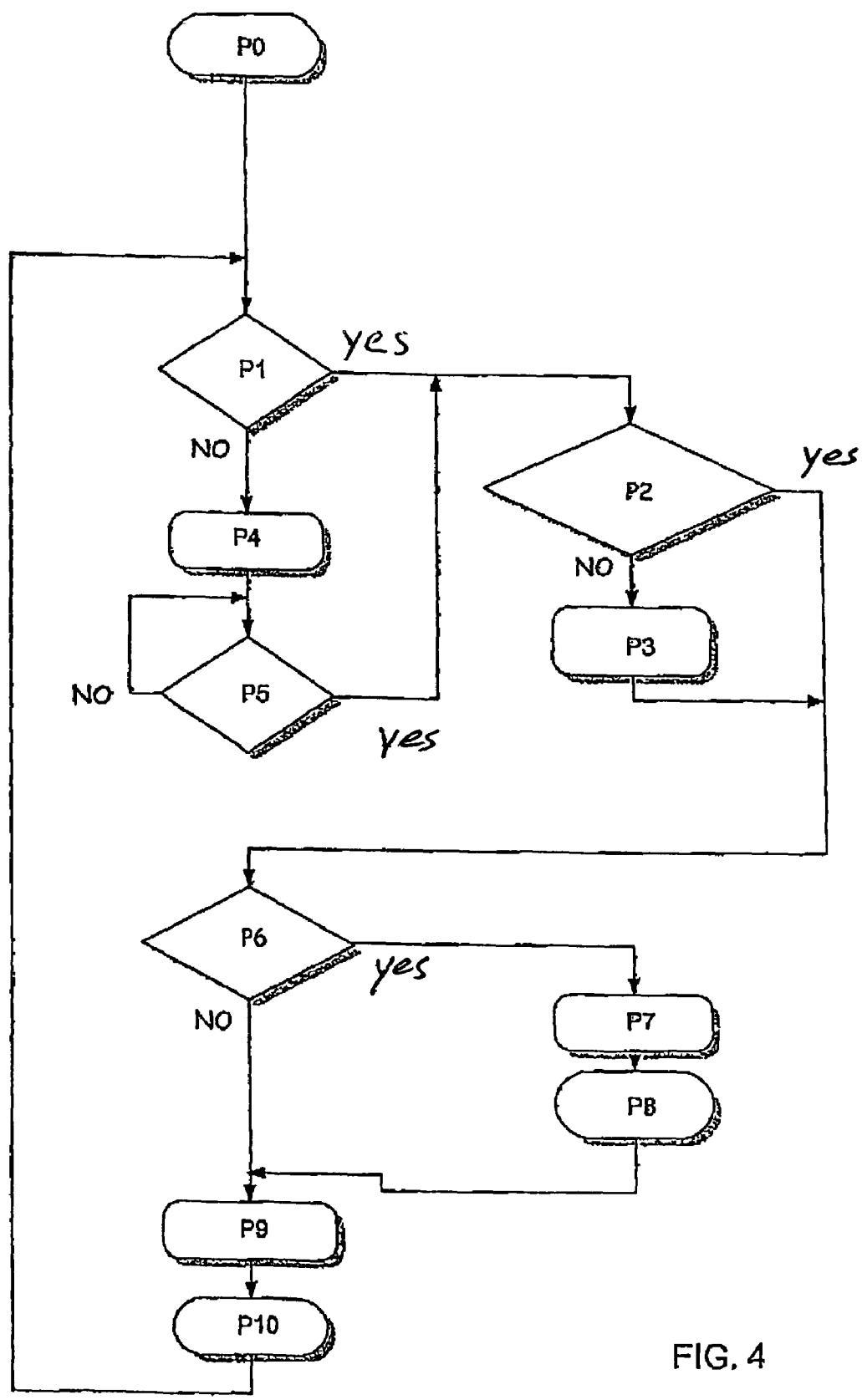
FIG. 4, a flow diagram of a program capable of controlling a flexing mechanism according to the invention.

FIG. 4 is a flow diagram of a program capable of controlling a flexing mechanism according to the invention. The program begins with a start-up step P0. Once it is running, the program is permanently active, and executes a series of closed loops. In the main loop, the programs verifies, P1, whether the key has been turned to the contact position, establishing the condition for attaining an activated state. In the affirmative, a check, P2, is run to see whether the manual button has been activated, so as to decide whether to extend the rearview mirror, P3, or not. If the reply in P1 is negative (contact has not been made), the rearview mirror is flexed or remains flexed, P4, and the program enters a waiting loop, P5, in which it continues to check for possible vehicle ignition and, if the vehicle is started, the program proceeds according to P2. In the event that the rearview mirror is in the extended position, a check is run on whether it is locked or unlocked, P6. In the event that it is unlocked it is locked, P7, which requires flexing it, and then extending it again, P8. Finally the program ascertains whether the manual button has been activated, P9, so as to assess whether it must extend or flex the rearview mirror, P10, and the general sequence is repeated, closing the main loop.

Logically, the microcontroller can receive additional information, such as that referring to the outside temperature, and it can determine time values, supply voltage values and current intensity ramp values, and the program can take this additional information into account, in the way indicated above.

The invention claimed is:

1. A flexing mechanism of an outside rearview mirror of a vehicle capable of moving said outside rearview mirror between a flexed position and an extended position and vice versa, of the type comprising an electric motor, a mechanical transmission, an electronic control circuit and a position detector informing on the position of the flexing mechanism, where said flexing mechanism is capable of attaining an activated state by being connected to an electrical power source and said rearview mirror is being moved from said flexed position to said extended position or vice versa, said flexing mechanism including a locking mechanism with indents and protrusions distributed between a fixed and a movable part of the rearview mirror which mesh together but can disengage in the presence of a strong force on said movable part, so that said flexing mechanism is capable of being in a locked position and in a disengaged position, characterized in that said electric motor and said position detector are supplied by common electric wires and in that through one of said supplying electrical wires is obtained a reading of the position detector output signal.

2. The flexing mechanism, according to claim 1, characterized in that said position detector is supplied on the basis of electrical impulses having a duration short enough to prevent them from moving the corresponding electric motor but long enough to obtain said reading of the position detector output signal.

3. The flexing mechanism according to claim 2, characterized in that said electronic control circuit includes a microcontroller.

4. The flexing mechanism, according to claim 2, characterised in that said position detector comprises a Hall effect sensor and at least one magnet.

5. The flexing mechanism, according to claim 3, characterised in that said vehicle is provided with two outside rearview mirrors and in that it comprises one single electronic control circuit capable of controlling both outside rearview mirrors.

6. The flexing mechanism, according to claim 5, characterized in that said electronic control circuit is housed in one of said outside rearview mirrors and in that said electronic control circuit is connected to the other of said outside rearview mirrors through only three electric wires.

7. The flexing mechanism according to claim 3, characterised in that it is provided with a button that allows said flexed position to be defined as a target position and in that if said target position has been defined by said button, said target position only can be modified by said button.

8. A control method of an outside rearview mirror flexing mechanism for a vehicle, capable of moving said outside rearview mirror between a flexed position and an extended position and vice versa, of the type comprising an electric motor, a mechanical transmission, an electronic control circuit and a position detector informing on the position of the flexing mechanism, where said flexing mechanism is capable of attaining an activated state by being connected to an electrical power source and said rearview mirror is being moved from said flexed position to said extended position or vice versa, said flexing mechanism including a locking mechanism with indents and protrusions distributed between a fixed and a movable part of the rearview mirror which mesh together but can disengage in the presence of a strong force on said movable part, so that said flexing mechanism is capable of being in a locked position and in a disengaged position, characterized in that said electronic control circuit performs a reading of an output signal of said position detector informing on the position of the flexing mechanism and when in said disengaged position, said electronic circuit activates that electric motor so that the mechanism itself corrects this position, automatically adopting a locked position again, and characterized in the said electric motor and said position detector are supplied by common electric wires and in that through one of said supplying electrical wires is obtained said reading of the position detector output signal.

9. The control method according to claim 8, characterized in that said position detector is supplied on the basis of electrical impulses having a duration short enough to prevent them from moving the corresponding electric motor but long enough to obtain said reading of the position detector output signal.

10. The control method according to claim 8, characterised in that an electric current intensity ramp circulating through said electric motor is detected when said electric motor tries to move said rearview mirror according to a supply voltage but is unable to do so, because said rearview mirror has reached one of said flexed or extended positions or because there is an obstacle in the trajectory of said rearview mirror preventing it from moving and in that said electronic control circuit interrupts the supply of electrical current to said electric motor according to the values of said current intensity ramp and some threshold values which are a function of the room temperature and said supply voltage.

* * * * *